(12) United States Patent
Thompson et al.

(10) Patent No.: US 10,306,172 B2
(45) Date of Patent: May 28, 2019

(54) TIME-OF-FLIGHT SENSOR READOUT CIRCUIT

(71) Applicant: Microsoft Technology Licensing, LLC, Redmond, WA (US)

(72) Inventors: Barry Thompson, Menlo Park, CA (US); Lawrence Albert Prather, Boulder Creek, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/870,722

(22) Filed: Jan. 12, 2018

(65) Prior Publication Data

US 2019/0082132 A1 Mar. 14, 2019

Related U.S. Application Data

(60) Provisional application No. 62/556,266, filed on Sep. 8, 2017.

(51) Int. Cl.
*H04N 5/378* (2011.01)
*H04N 5/374* (2011.01)
(Continued)

(52) U.S. Cl.
CPC ........... *H04N 5/378* (2013.01); *G01S 7/4863* (2013.01); *H04N 5/3742* (2013.01);
(Continued)

(58) Field of Classification Search
CPC .. H04N 5/378; H04N 5/3742; H04N 5/37457; H04N 5/3575; G01S 7/4863; G01S 17/10
See application file for complete search history.

(56) References Cited

U.S. PATENT DOCUMENTS

| 3,781,574 A | 12/1973 | White et al. |
| 6,137,533 A * | 10/2000 | Azim ................ H04N 5/2352 348/222.1 |

(Continued)

FOREIGN PATENT DOCUMENTS

WO 2017050633 A1 3/2017

OTHER PUBLICATIONS

John, Jaya John, "PImMS: an event-triggered time-stamping sensor with storage of multiple timestamps", Retrieves From <<http://pimms.chem.ox.ac.uk/downloads/PlmMS_PIXEL2012.pdf>>, Sep. 6, 2012, pp. 1-26.

(Continued)

*Primary Examiner* — Eliza W Osenbaugh-Stewar
(74) *Attorney, Agent, or Firm* — Alleman Hall Creasman & Tuttle LLP

(57) ABSTRACT

A time-of-flight image sensor including a readout circuit is provided. The readout circuit may include a pixel array including multiple pixels. The pixel array may be configured to produce a pixel signal for each of one or more pixels over a series of timesteps. The pixel signal may include an illuminated value and a reset value. The readout circuit may further include a plurality of gain selection comparators configured to receive the pixel signal and select an amplifier gain value. The readout circuit may further include analog correlated double sampling circuitry. The readout circuit may further include a programmable gain amplifier configured to generate an amplified pixel signal from the pixel signal, which may be amplified at the selected amplifier gain value. The readout circuit may further include a plurality of analog-to-digital converters. Each of the analog-to-digital converters may have a common ramp generated by a global ramp generator.

20 Claims, 8 Drawing Sheets

(51) Int. Cl.
  *G01S 7/486* (2006.01)
  *H04N 5/3745* (2011.01)
  *H04N 5/357* (2011.01)
  *G01S 17/10* (2006.01)

(52) U.S. Cl.
  CPC .......... *H04N 5/37457* (2013.01); *G01S 17/10* (2013.01); *H04N 5/3575* (2013.01)

(56) References Cited

U.S. PATENT DOCUMENTS

| | | | |
|---|---|---|---|
| 9,432,597 B2 | 8/2016 | Guidash et al. | |
| 9,565,379 B2 | 2/2017 | Yoo | |
| 2008/0239124 A1 | 10/2008 | Mori et al. | |
| 2012/0274744 A1* | 11/2012 | Wan | H04N 5/37452 348/46 |
| 2016/0309140 A1 | 10/2016 | Wang et al. | |
| 2016/0329906 A1 | 11/2016 | Patukuri et al. | |
| 2017/0237914 A1 | 8/2017 | Cho et al. | |
| 2017/0332029 A1 | 11/2017 | Feick | |

OTHER PUBLICATIONS

Bult, et al., "A Fast-Settling CMOS Op Amp for SC Circuits with 90-dB DC Gain", In IEEE Journal of Solid-State Circuits, vol. 25, No. 6, Dec. 1990, pp. 1379-1384.

Wang, et al, "An 8-bit 150-MHz CMOS A/D converter an 8-bit 150-MHz CMOS A/D converter", In IEEE Journal of Solid-State Circuits, vol. 35, No. 3, Mar. 2000, pp. 308-317.

Bamji, et al., "A 0.13 um CMOS System-on-Chip for 512*424 Time-of-Flight Image Sensor With Multi-Frequency Photo-Demodulation up to 130 MHz and 2 GS/s ADC", In IEEE Journal of Solid-State Circuits, vol. 50, Issue 1, Jan. 2015, pp. 303-319.

"International Search Report and Written Opinion Issued in PCT Application No. PCT/US2018/038883", dated Sep. 14, 2018, 11 Pages.

* cited by examiner

TIME-OF-FLIGHT SENSOR READOUT CIRCUIT

CROSS REFERENCE TO RELATED APPLICATIONS

This application claims priority to U.S. Provisional Patent Application Ser. No. 62/556,266, filed Sep. 8, 2017, the entirety of which is hereby incorporated herein by reference for all purposes.

BACKGROUND

Time-of-flight image sensors are used for detecting distances in a variety of applications, such as robotics, video games, and mapping. Time-of-flight image sensors typically include readout circuits that process signals measured by a collector so that the signals may be used as input by a computing device. The signals are typically amplified by the readout circuit.

SUMMARY

According to one aspect of the present disclosure, a time-of-flight image sensor including a readout circuit is provided. The readout circuit may comprise a pixel array including multiple pixels. The pixel array may be configured to produce a pixel signal for each of one or more pixels over a series of timesteps. The pixel signal may include an illuminated value at an illuminated timestep and a reset value at a reset timestep. The readout circuit may further comprise a plurality of gain selection comparators configured to receive the pixel signal and select an amplifier gain value from a plurality of predefined amplifier gain values based upon a difference between the illuminated value and the reset value. The readout circuit may further comprise analog correlated double sampling circuitry configured to perform analog correlated double sampling on the pixel signal. The readout circuit may further comprise a programmable gain amplifier configured to generate an amplified pixel signal from the pixel signal. The pixel signal may be amplified at the selected amplifier gain value. The readout circuit may further comprise a plurality of analog-to-digital converters configured to convert the amplified pixel signal to a digital pixel signal. Each of the plurality of the analog-to-digital converters may have a common ramp generated by a global ramp generator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors have discovered several drawbacks with existing readout circuits for time-of-flight image sensors. For example, conventional time-of-flight image sensors do not always amplify the signals at an appropriate gain relative to signal strength. As such, the dynamic range of conventional time-of-flight sensors may be lower than would be desirable. In addition, conventional time-of-flight sensors may have low signal-to-noise ratios due to variation between pixels. Readout circuits of conventional time-of-flight sensors may introduce further error into measurements, for example due to nonlinearity of circuit components.

Figure 1:
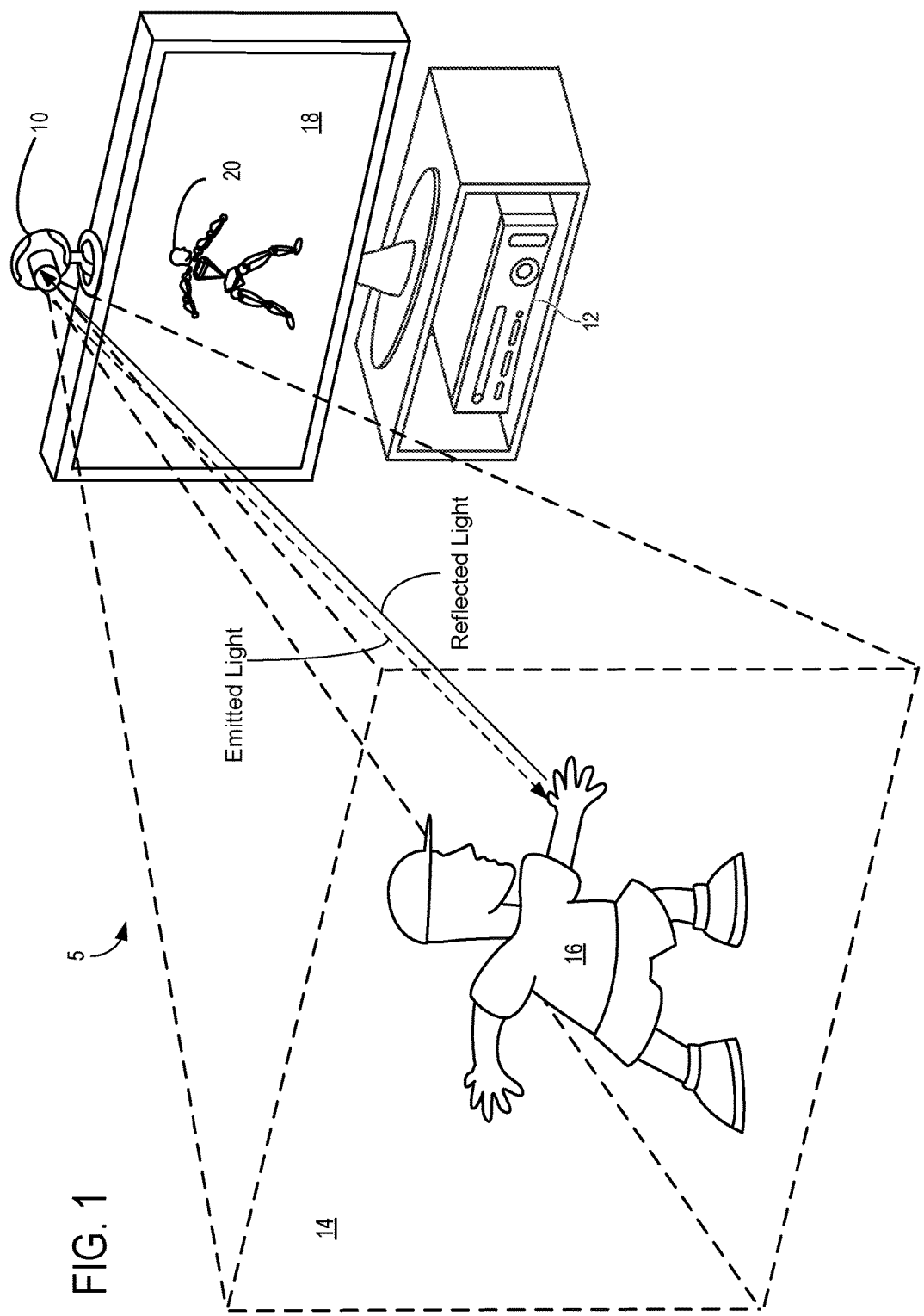
FIG. 1 shows a computing system including a time-of-flight image sensor, according to one embodiment of the present disclosure.

FIG. 1 depicts a computing system 5 including a time-of-flight image sensor 10 according to an example embodiment of the present disclosure, which may address the issues discussed above. Computing system 5 further includes a computing device 12 and a display 18. The time-of-flight image sensor 10 is configured to image a physical environment 14 that includes an imaged object 16. In the example embodiment of FIG. 1, the imaged object 16 is a user. The time-of-flight sensor 10 includes an emitter (see 103 in FIGS. 2A and 2B) configured to emit pulses of emitted light in a direction of the imaged object 16. Preferably, the emitted light is infrared or near-infrared light. The emitted light may be structured light emitted in a pattern. Typically, the emitter 103 is a laser, however other types of light sources may be utilized as the emitter 103. Some of the emitted light reflects off the imaged object 16 and returns to the time-of-flight sensor 10. Based on the reflected light, the time-of-flight sensor 10 forms a depth image 20 of the imaged object 16. The time-of-flight sensor 10 includes an optical sensor (see pixel array 100 in FIGS. 2A and 2B), which may be a charge-coupled device (CCD) optical sensor or complementary metal oxide semiconductor (CMOS) optical sensor, for example. The image of the captured by the optical sensor is referred to as a depth image 20. The depth image 20, or an image produced based on the depth image 20, may be displayed on the screen 18. In the depicted embodiment, the displayed image is an animated player character in a computer game that is controlled by movements of the user detected by the time-of-flight image sensor 10.

Figure 2A:
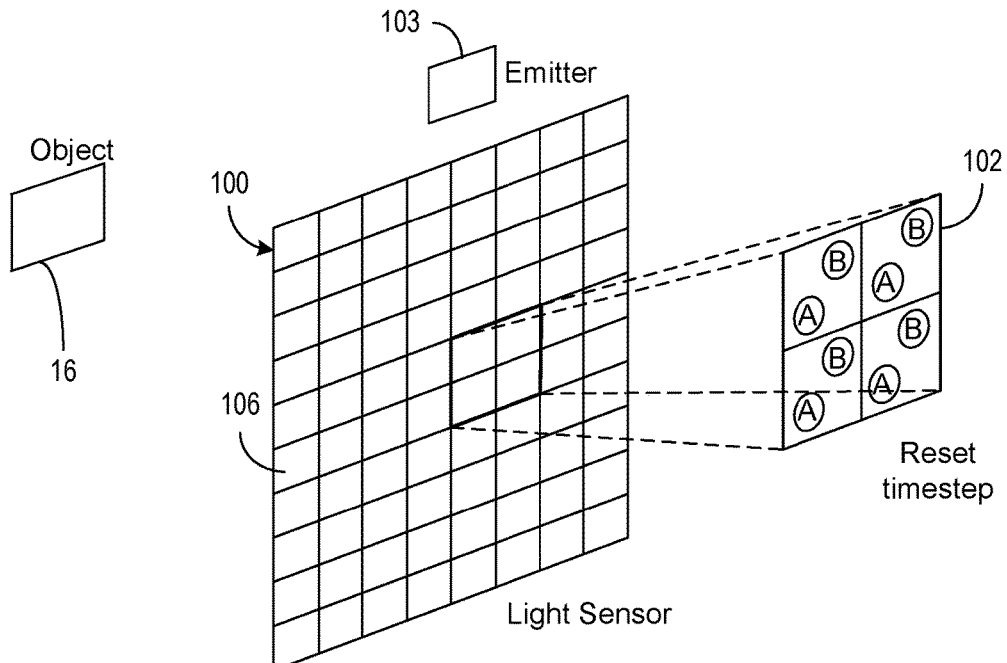
FIG. 2A shows a pixel array at a reset timestep, according to the embodiment of FIG. 1.

Turning now to FIG. 2A, the optical sensor may include a pixel array 100 including multiple pixels 104. The pixel array 100 may be included in a readout circuit (see 200 in FIGS. 4 and 300 in FIG. 5) of the time-of-flight image sensor 10 of FIG. 1. It will be appreciated that the light emitted by emitter 103 varies with time and is measured in a series of timesteps. FIG. 2A shows the pixel array at a first timestep, which may be a reset timestep. In this depicted scenario, the emitted light is not pulsed at the reset timestep, and thus the pixel array 100 does not receive reflected light from the emitted light in the reset timestep. Alternatively, the pattern of emitted light may be designed such that during the reset timestep some light is emitted from the emitter 103. Thus, in some embodiments, the reset timestep may be a timestep between pulses of emitted light. In other embodiments, the reset timestep may be a timestep at which a shutter of the time-of-flight image sensor 10 is closed. The time-of-flight sensor 10 may detect light received by the pixel array 100 when the emitter 103 does not emit light, in order to determine a reset value. The reset value is a measure of background light that is used to perform analog correlated double sampling, as described below with reference to FIGS. 4 and 5.

Figure 2B:
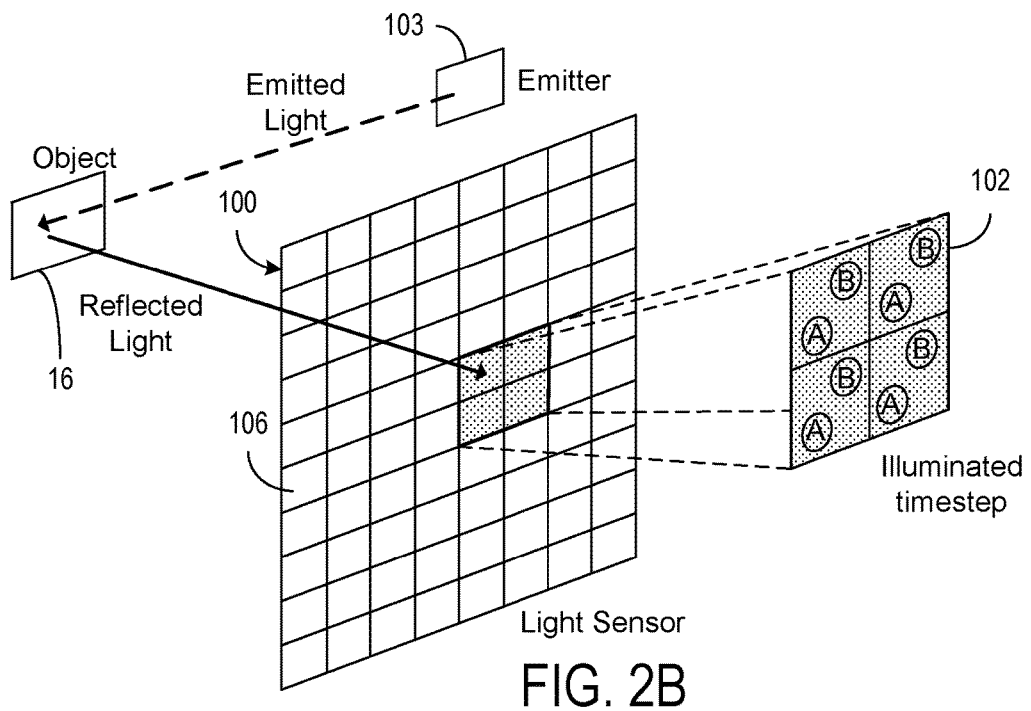
FIG. 2B shows a pixel array at an illuminated timestep, according to the embodiment of FIG. 1.

FIG. 2B shows the pixel array 100 of FIG. 2A at a second timestep, which may be an illuminated timestep in which the emitter 103 is emitting light. The one or more pixels 102 depicted when reset in FIG. 2A are shown when illuminated in FIG. 2B. Although four pixels shown in FIGS. 2A and 2B, the one or more pixels 102 may include some other number of pixels. As shown in FIG. 2B, light emitted from the emitter 103 of the time-of-flight image sensor 10 reflects off the imaged object 16 and is received by the pixel array 100. The light emitted by the emitter 103 is modulated according to a periodic waveform. The pixel array 100 is configured to produce an electric current when it receives light.

Figure 3:
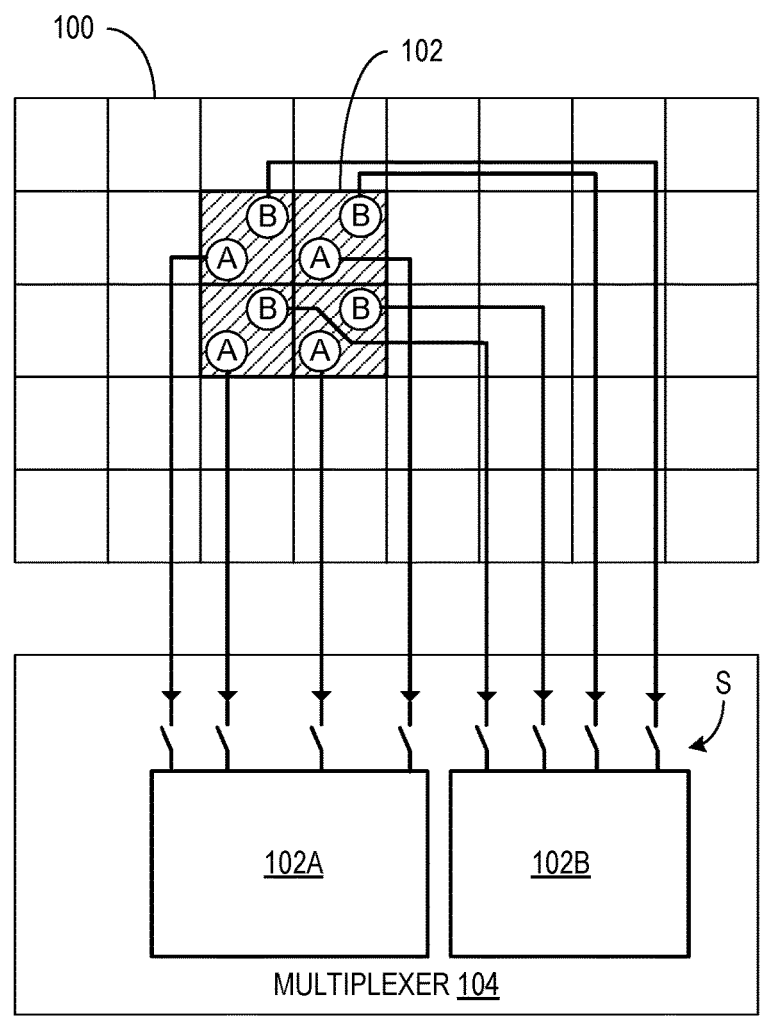
FIG. 3 shows a pixel array and a multiplexer, according to the embodiment of FIG. 1.

FIG. 3 shows the pixel array 100, including the one or more 102 of FIG. 2A. Each of the pixels included in the one or more 102 includes a first detector A and a second detector B. The one or more pixels 102 are each configured to transmit a first pixel signal from the first detector A and a second pixel signal from the second detector B to a multiplexer 104, which may be included in the readout circuit 200, 300 (see FIGS. 4, 5) of the time-of-flight image sensor 10.

The multiplexer 104 is configured to select the plurality of the pixels 102 of the pixel array 100. More particularly, the multiplexer 104 is configured to select the respective first detectors A and second detectors B of the plurality of the pixels 102, via switches S, and combine or bin their outputs. As shown in FIG. 3, the multiplexer 104 may select the one or more 102 by selecting at least one row and at least one column of the pixel array 100. In some embodiments, the multiplexer 104 may be configured to select one or two columns and one or two rows of the pixel array 100. In other embodiments, the multiplexer 104 may select different numbers of rows and columns. In addition, while the one or more pixels 102 shown in FIG. 3 are selected from adjacent rows and columns, the multiplexer 104 may, in some embodiments, select one or more pixels from non-adjacent rows and/or columns.

Figure 4:
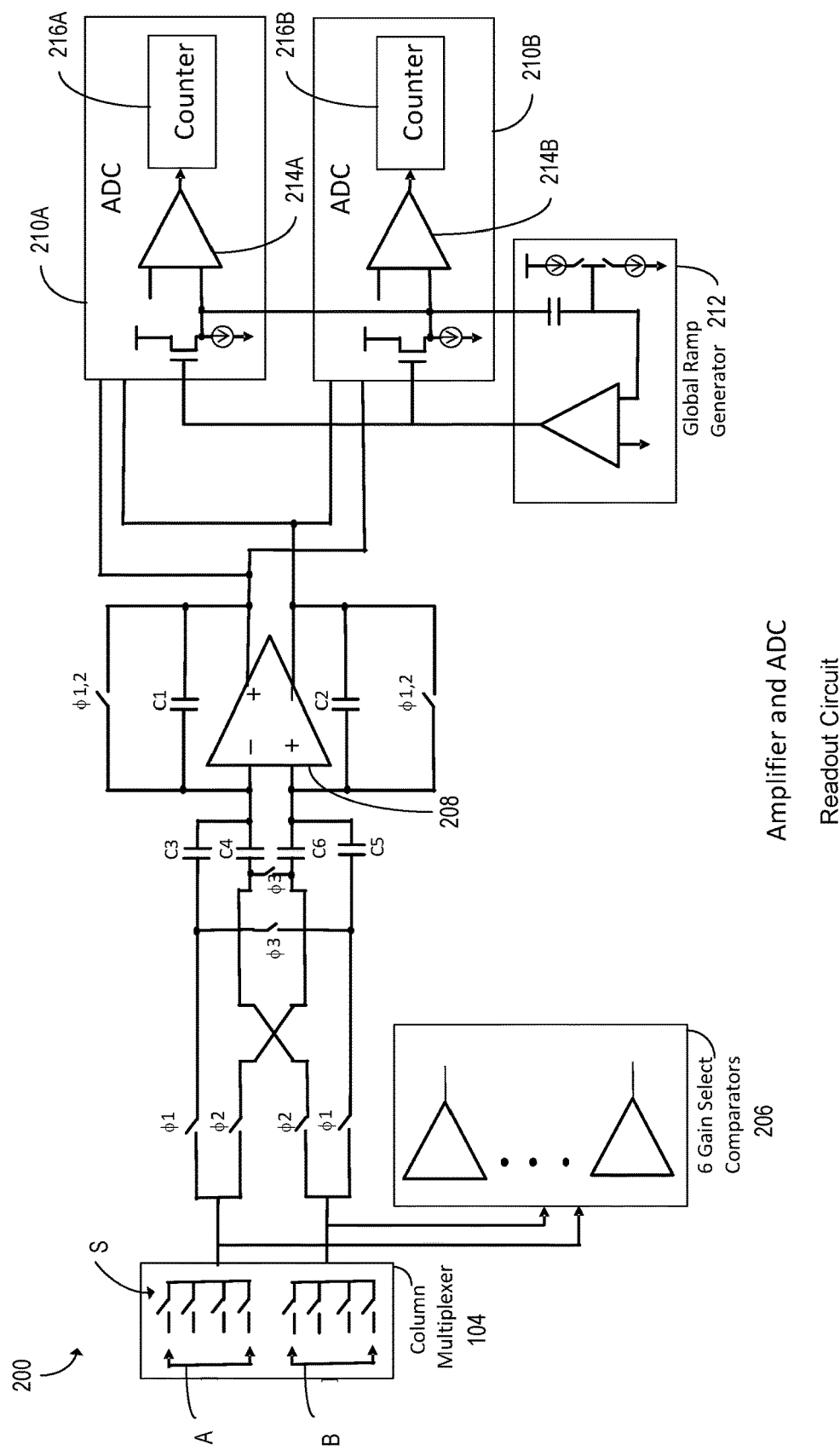
FIG. 4 shows an example readout circuit of the time-of-flight image sensor, according to the embodiment of FIG. 1.

The multiplexer 104 is configured to produce a multiplexed signal based on pixel signals of the selected one or more pixels 102 over a series of timesteps. The multiplexed signal includes an illuminated value for the selected one or more pixels 102 at an illuminated timestep and a reset value for the selected one or more pixels 102 at a reset timestep. As shown in FIG. 4, the first and second detectors A, B of the one or more pixels 102 as sampled at the illuminated timestep are each type of detector is binned together into a first binned pixel 102A corresponding to the first detectors A of the one or more pixels 102 and a second binned pixel 102B corresponding to the second detectors B of the one or more pixels 102. Although the resolution of the multiplexed signal for the one or more pixels 102 may be lower than that of an individual pixel signal, the signal-to-noise ratio of the multiplexed signal may be higher due to averaging of noise over the selected one or more pixels 102.

Figure 5:
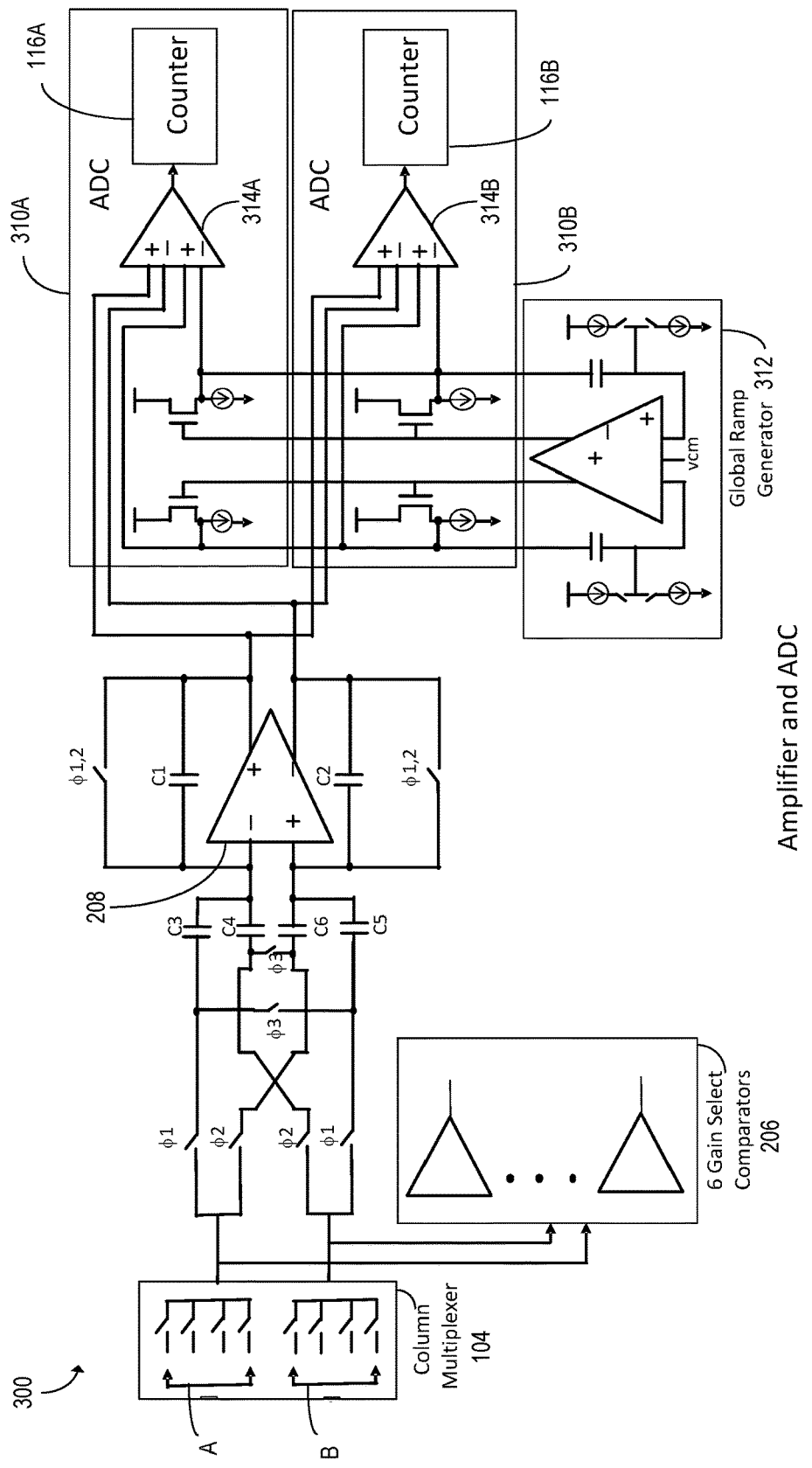
FIG. 5 shows another example readout circuit of the time-of-flight image sensor, according to the embodiment of FIG. 1.

Although a multiplexer 104 is depicted in each of FIGS. 3-5, embodiments in which the readout circuit of the time-of-flight image sensor 10 does not include a multiplexer are also contemplated. In such embodiments, a readout circuit may be provided for each pixel of the pixel array 100, and binning of the pixel signals from the first and second detectors A and B of a plurality of pixels may not be performed. Instead, the pixel signals of the one or more pixels 102 may be processed separately. In such embodiments, the pixel array 100 may be configured to produce a pixel signal for each of the one or more pixels 102 over a series of timesteps. The pixel signal may include an illuminated value at an illuminated timestep and a reset value at a reset timestep.

FIG. 4 depicts the readout circuit 200 of the time-of-flight image sensor 10 of FIG. 1. As discussed above, the readout circuit 200 includes the multiplexer 104. Each pixel of the one or more pixels 102 includes a first detector A and a second detector B. The first detector A and the second detector B may be electrodes that function as collectors. The first detector A and the second detector B may share a pixel clock according to which the first detector A and the second detector B perform measurements at a predefined frequency.

The first detector A may perform measurements at a first phase shift relative to the phase of the emitted light, and the second detector B may perform measurements at a second phase shift. Referring to FIG. 2A, because the light pulses received at the pixel array 100 have traveled out to the imaged object 16 and back, they differ in phase from the pulse train released by the emitter 103. The phase difference varies (e.g., increases) in proportion to the distance between the imaged object 16 and the time-of-flight image sensor 10, but wraps upon reaching a $2\pi$ radian phase shift. By determining the phase shift for each pixel of the pixel array 100, a depth map of the imaged object 16 can be computed. In addition, emitted light of a plurality of wavelengths is used to de-alias the pixel signal when detecting and imaged object 16 that is further away from the emitter 103 than one wavelength of the emitted light.

The readout circuit 200 of the time-of-flight image sensor 10 is configured to measure the reflected light over a plurality of integration periods during which light is received at each phase and wavelength emitted by the emitter 103. At the beginning of each integration period, the charge on each pixel of the pixel array 202 is reset. The first detector A and the second detector B then measure the amount of charge corresponding to the reset value and reset pixel noise. At the end of the integration period, the first detector A and the second detector B measure the amount of charge corresponding to the illuminated value and reset pixel noise. Subtraction of these two samples removes both the reset value and reset pixel noise, leaving only the illuminated value. The reset value and the illuminated value may be stored in a plurality of capacitors, as described below.

Returning to FIG. 4, the readout circuit 200 of the time-of-flight image sensor 10 further includes a plurality of gain selection comparators 206. The plurality of gain selection comparators 206 are configured to select an amplifier gain value from a plurality of predefined amplifier gain values based upon a difference between the illuminated value of the pixel signal and the reset value of the pixel signal. In some embodiments, the plurality of gain selection comparators 206 are configured to compare a value of the pixel signal to a plurality of decision threshold values. The value of the pixel signal may be the illuminated value, the reset value, or a value determined based on the illuminated value and/or the reset value. In such embodiments, the plurality of gain selection comparators 206 may be configured to select the amplifier gain value based on a comparison of the difference between the illuminated value and the reset value of the pixel signal to the decision threshold values. The plurality of gain selection comparators 206 may compare the sign and/or magnitude of the illuminated value and the reset value. In some embodiments, the plurality of gain selection comparators 206 may include six gain selection comparators, which may be connected in parallel. In such embodiments, the plurality of decision threshold values may include three decision threshold values, and the plurality of amplifier gain values includes four amplifier gain values. In some embodiments, the amplifier gain values may be within a range from 0.25 to 24. In some embodiments, each of the plurality of gain selection comparators 206 may include a preamplifier configured to amplify the pixel signal.

The readout circuit 200 of the time-of-flight sensor 10 further includes analog correlated double sampling circuitry configured to perform analog correlated double sampling on the pixel signal. The analog correlated double sampling circuitry may be configured to determine a difference between the illuminated value and the reset value of the pixel signal. As shown in FIG. 4, the analog correlated double sampling circuitry may include a plurality of capacitors C1, C2, C3, C4, C5, and C6. The plurality of gain selection comparators 206 may be connected in parallel to the plurality of capacitors C1, C2, C3, C4, C5, and C6. In the example embodiment of FIG. 4, the plurality of capacitors C1, C2, C3, C4, C5, and C6 are configured to perform analog correlated double sampling on the pixel signal by storing the illuminated value, storing the reset value, and subtracting the reset value from the illuminated value. The illuminated value may be stored at a first pair of capacitors C4 and C6 of the plurality of capacitors. The reset value may be stored at a second pair of capacitors C3 and C5. The reset value may be subtracted from the illuminated value and amplified by transferring the charges on C3-C6 onto a third pair of capacitors C1 and C2. In some embodiments, the reset value may be subtracted from the illuminated value at a third timestep following the second timestep. The plurality of gain selection comparators 206 may perform analog correlated double sampling with capacitors similar to C3-C6, and may also perform reset subtraction with a capacitor arrangement in the manner described above.

The readout circuit 200 of the time-of-flight image sensor 10 further includes a programmable gain amplifier 208 configured to generate an amplified pixel signal from the pixel signal. The programmable gain amplifier 208 may be connected to the plurality of gain select comparators 206 and the analog correlated double sampling circuitry. At the programmable gain amplifier 208, following the performance of analog correlated double sampling on the pixel signal, the pixel signal is amplified at the selected amplifier gain value determined by the plurality of gain selection comparators 206. As shown in FIG. 4, the pixel signal following the performance of analog correlated double sampling may be received by the programmable gain amplifier 208 from the third pair of capacitors C1 and C2.

The readout circuit 200 of the time-of-flight image sensor 10 further includes a plurality of analog-to-digital converters (ADCs) configured to convert the amplified pixel signal to a digital pixel signal. A first ADC 210A and a second ADC 210B are shown in FIG. 4. The first ADC 210A includes a first comparator 214A and a first counter 216A, and the second ADC 210B includes a second comparator 214B and a second counter 216B. The analog-to-digital converters 210A and 210B may be single-slope analog-to-digital converters. In such embodiments, each single-slope analog-to-digital converter of the plurality of single-slope analog-to-digital converters 210A and 210B may include a distributed source-follower. In other embodiments, the ADCs 210A and 210B may be double-slope, multi-slope, successive approximation, oversampling, pipelined, cyclic, or flash ADCs.

Each of the plurality of the analog-to-digital converters 210A and 210B has a common ramp generated by a global ramp generator 212. The common ramp may be applied to each analog-to-digital converter of each readout circuit 200 included in the time-of-flight image sensor 10, or alternatively to some subset thereof. The comparators 214A and 214B of the ACDs 210A and 210B may compare the pixel signal to the common ramp generated by the global ramp generator 212. In embodiments in which each ADC includes a distributed source-follower, each distributed source-follower may be included in a feedback loop of the global ramp generator 212. Including the distributed source-followers in the feedback loop of the global ramp generator 212 may improve the linearity of the global ramp generator 212.

Although only two analog-to-digital converters 210A and 210B are shown in FIG. 4, each pixel in the pixel array 100 may have an associated pair of analog-to-digital converters. In some embodiments, the global ramp generator 212 may be connected to each analog-to-digital converter associated with a pixel in the pixel array 100.

FIG. 5 depicts another example embodiment of a readout circuit 300 of the time-of-flight sensor 10. In the example embodiment of FIG. 5, the global ramp generator 312 is a differential global ramp generator. The global ramp generator 312 is configured to provide a first common ramp and a second common ramp to the first ADC 310A and the second ADC 310B. The first common ramp and the second common ramp may be applied to each first ADC 310A and each second ADC 310B of each readout circuit 300 included in the time-of-flight image sensor 10. Alternatively, each of the first common ramp and the second common ramp may be applied to respective subsets of the readout circuits 300 included in the time-of-flight image sensor 10. In the readout circuit 300 of FIG. 5, the ADCs 310A and 310B include a comparator 314A and a comparator 314B respectively. The comparators 314A and 314B are configured to compare the first common ramp and the second common ramp to the pixel signal after analog correlated double sampling is performed.

Figure 6A:
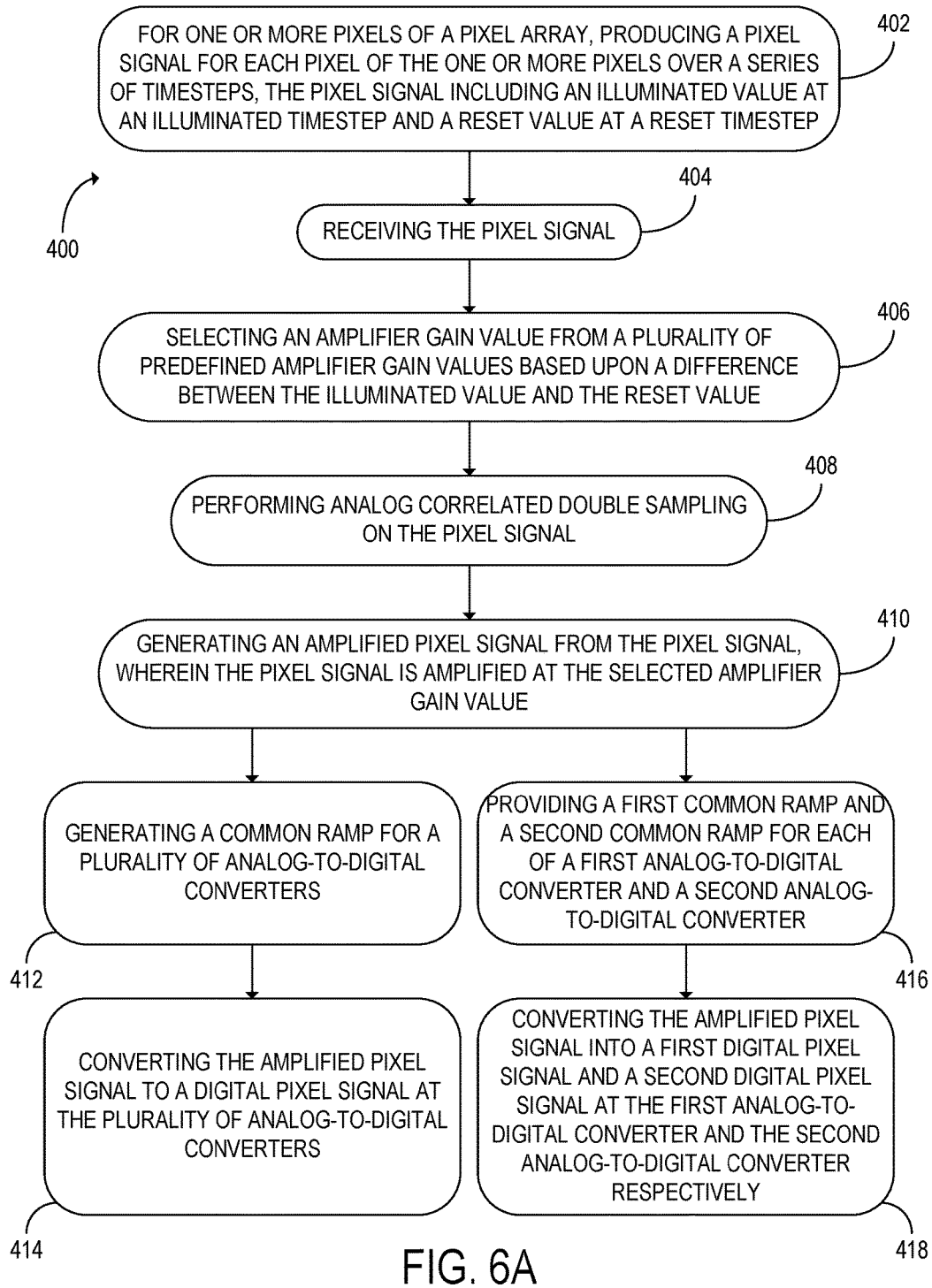
FIG. 6A shows a flowchart of an example method for sensing a time-of-flight image, which may be performed by the time-of-flight image sensor of claim 1.

FIG. 6A shows a flowchart of an example method 400 for sensing a time-of-flight image using a time-of-flight image sensor including a readout circuit, which may be the readout circuit 200 of FIG. 4 or the readout circuit 300 of FIG. 5. Alternatively, some other readout circuit may be used. The time-of-flight image sensor may further include an emitter configured to emit light. The time-of-flight image sensor with which the method 400 is used may be included in a computing system, which may be the computing system 5 of FIG. 1.

At step 402, the method 400 may include, for one or more pixels of a pixel array, producing a pixel signal for each pixel of the one or more pixels over a series of timesteps. In some embodiments, the one or more pixels may be selected using a multiplexer included in the readout circuit. The pixel signal may include an illuminated value at an illuminated timestep and a reset value at a reset timestep. The illuminated timestep may be a timestep at which the emitter is emitting light, and the reset timestep may be a timestep at which the emitter is not emitting light. In embodiments in which the readout circuit includes a multiplexer, the pixel signal may be a multiplexed signal produced by the multiplexer.

Figure 6B:
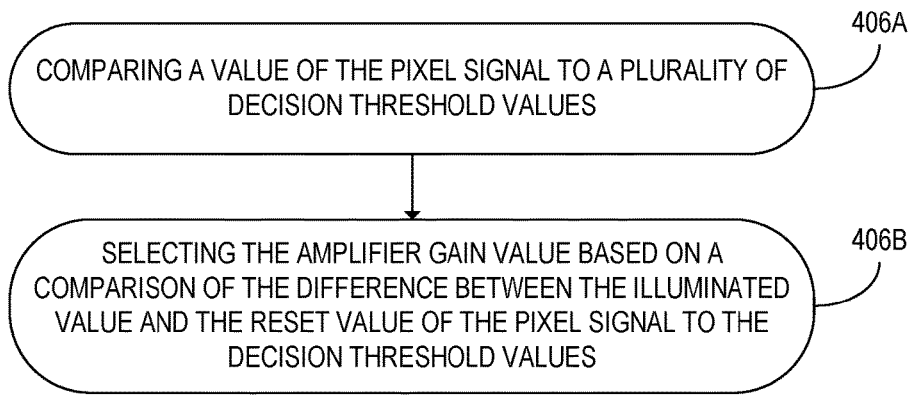
FIGS. 6B and 6C show flowcharts of additional steps that may be included in the method of FIG. 6A in some embodiments.

At step 404, the method 400 may further include receiving the pixel signal at a plurality of gain selection comparators. At step 406, the method 400 may further include, at the gain selection comparators, selecting an amplifier gain value from a plurality of predefined amplifier gain values based upon a difference between the illuminated value and the reset value included in the pixel signal. Additional steps that may be performed to select the amplifier gain value in some embodiments are shown in FIG. 6B. At step 406A, the method 400 may further include comparing a value of the pixel signal to a plurality of decision threshold values. In some embodiments, the value of the pixel signal may be compared to the plurality of decision threshold values by a plurality of gain selection comparators. In some embodiments, the plurality of gain selection comparators may include six gain selection comparators. In addition, in some embodiments, the plurality of decision threshold values may include three decision threshold values. At step 406B, the method may include selecting the amplifier gain value based on a comparison of the difference between the illuminated value and the reset value of the pixel signal to the decision threshold values. In some embodiments, the plurality of amplifier gain values may include four amplifier gain values.

Figure 6C:
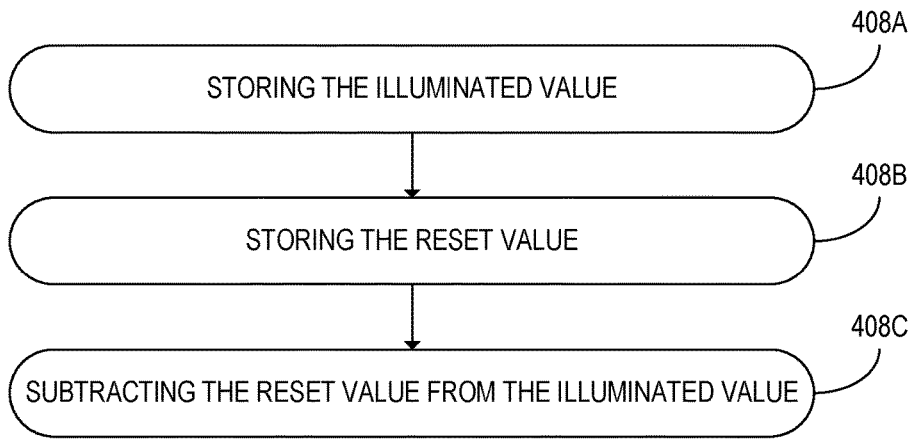

Returning to FIG. 6A, at step 408, the method 400 may include performing analog correlated double sampling on the pixel signal. In some embodiments, analog correlated double sampling may be performed on the pixel signal at least in part by analog correlated double sampling circuitry including a plurality of capacitors. FIG. 6C shows additional steps that may be performed in such embodiments when performing analog correlated double sampling. At step 408A, the method 400 may further include storing the illuminated value. At step 408B, the method 400 may further include storing the reset value. The illuminated value and the reset value may be stored by the plurality of capacitors. At step 408C, the method 400 may further include subtracting the reset value from the illuminated value.

Returning to FIG. 6A, the method 400 may further include, at step 410, generating an amplified pixel signal from the pixel signal, wherein the pixel signal is amplified at the selected amplifier gain value. The pixel signal may be amplified by a programmable gain amplifier, which in some embodiments may be connected to the plurality of gain selection comparators and the analog correlated double sampling circuitry.

At step 412, the method 400 may further include generating a common ramp for a plurality of analog-to-digital converters. In some embodiments, the common ramp may be generated by a differential global ramp generator. In some embodiments, the method 400 may instead include, at step 416, providing a first common ramp and a second common ramp for each of a first analog-to-digital converter and a second analog-to-digital converter. The first common ramp and the second common ramp may be generated by a differential global ramp generator.

At step 414, the method may further include converting the amplified pixel signal to a digital pixel signal at the plurality of analog-to-digital converters. In some embodiments, each analog-to-digital converter of the plurality of analog-to-digital converters may be a single-slope analog-to-digital converter including a comparator and a counter. In other embodiments, the ADCs and may be double-slope, multi-slope, successive approximation, oversampling, pipelined, cyclic, or flash ADCs. In embodiments in which a first common ramp and a second common ramp are provided for each of a first analog-to-digital converter and a second analog-to-digital converter, the method 400 may instead include, at step 418, converting the amplified pixel signal into a first digital pixel signal and a second digital pixel signal at the first analog-to-digital converter and the second analog-to-digital converter respectively.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
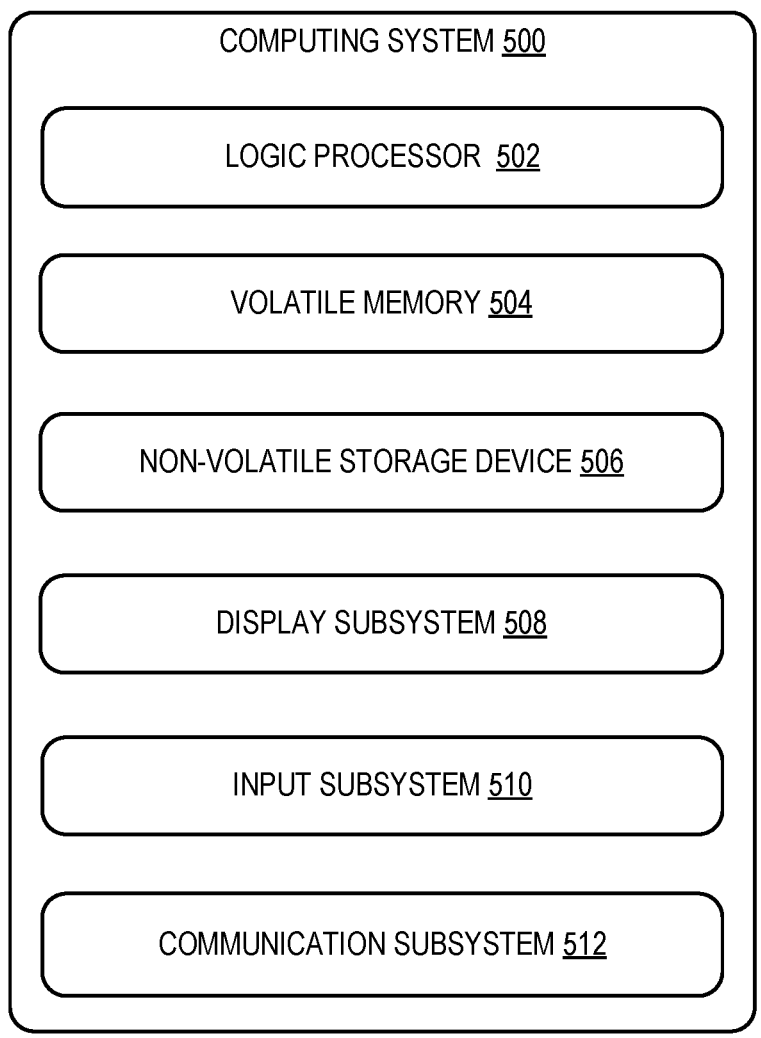
FIG. 7 shows a schematic depiction of an example computing device that may be used as the computing device of FIG. 1.

FIG. 7 schematically shows a non-limiting embodiment of a computing system 500 that can enact one or more of the methods and processes described above. Computing system 500 is shown in simplified form. Computing system 500 may embody the computing device 12. Computing system 500 may take the form of one or more personal computers, server computers, tablet computers, network computing devices, mobile computing devices, mobile communication devices (e.g., smart phone), and/or other computing devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 7.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, it will be understood that these virtualized aspects are run on different physical logic processors of various different machines.

Non-volatile storage device 506 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 506 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504. One example of volatile memory 504 is random access memory (RAM).

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 that is typically software stored in non-volatile memory and implemented by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, microphone, camera, or game controller. When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

According to one aspect of the present disclosure, a time-of-flight image sensor including a readout circuit is provided. The readout circuit may comprise a pixel array including multiple pixels. The pixel array may be configured to produce a pixel signal for each of one or more pixels over a series of timesteps. The pixel signal may include an illuminated value at an illuminated timestep and a reset value at a reset timestep. The readout circuit may further comprise a plurality of gain selection comparators configured to receive the pixel signal and select an amplifier gain value from a plurality of predefined amplifier gain values based upon a difference between the illuminated value and the reset value. The readout circuit may further comprise analog correlated double sampling circuitry configured to perform analog correlated double sampling on the pixel signal. The readout circuit may further comprise a programmable gain amplifier configured to generate an amplified pixel signal from the pixel signal. The pixel signal may be amplified at the selected amplifier gain value. The readout circuit may further comprise a plurality of analog-to-digital converters configured to convert the amplified pixel signal to a digital pixel signal. Each of the plurality of the analog-to-digital converters may have a common ramp generated by a global ramp generator.

According to this aspect, the time-of-flight image sensor may further comprise a multiplexer configured to select the one or more pixels of the pixel array and produce a multiplexed signal based on pixel signals of the selected one or more pixels.

According to this aspect, the plurality of gain selection comparators may be configured to compare a value of the pixel signal to a plurality of decision threshold values. The plurality of gain selection comparators may be further configured to select the amplifier gain value based on a comparison of the difference between the illuminated value and the reset value of the pixel signal to the decision threshold values. According to this aspect, the plurality of gain selection comparators may include six gain selection comparators. According to this aspect, the plurality of decision threshold values may include three decision threshold values, and the plurality of amplifier gain values may include four amplifier gain values.

According to this aspect, the analog correlated double sampling circuitry may include a plurality of capacitors. According to this aspect, the plurality of gain selection comparators may be connected in parallel to the plurality of capacitors. According to this aspect, the plurality of capacitors may be configured to perform analog correlated double sampling on the pixel signal by storing the illuminated value, storing the reset value, and subtracting the reset value from the illuminated value. According to this aspect, the illuminated value may be stored at a first pair of capacitors of the plurality of capacitors, the reset value may be stored at a second pair of capacitors of the plurality of capacitors, and the reset value may be subtracted from the illuminated value at a third pair of capacitors of the plurality of capacitors.

According to this aspect, the analog-to-digital converters may be single-slope analog-to-digital converters. According to this aspect, each single-slope analog-to-digital converter of the plurality of single-slope analog-to-digital converters may include a distributed source-follower. According to this aspect, each distributed source-follower may be included in a feedback loop of the global ramp generator. According to this aspect, the global ramp generator may be a differential global ramp generator.

According to another aspect of the present disclosure, a method for sensing a time-of-flight image is provided. The method may comprise, for one or more pixels of a pixel array, producing a pixel signal for each pixel of the one or more pixels over a series of timesteps. The pixel signal may include an illuminated value at an illuminated timestep and a reset value at a reset timestep. The method may further comprise, at a plurality of gain selection comparators, receiving the pixel signal and selecting an amplifier gain value from a plurality of predefined amplifier gain values based upon a difference between the illuminated value and the reset value. The method may further comprise performing analog correlated double sampling on the pixel signal. The method may further comprise generating an amplified pixel signal from the pixel signal, wherein the pixel signal is amplified at the selected amplifier gain value. The method may further comprise generating a common ramp for a plurality of analog-to-digital converters. The method may further comprise converting the amplified pixel signal to a digital pixel signal at the plurality of analog-to-digital converters.

According to this aspect, the amplifier gain value may be selected using a plurality of gain selection comparators. According to this aspect, the method may further comprise, at the plurality of gain selection comparators, comparing a value of the pixel signal to a plurality of decision threshold values. The method may further comprise selecting the amplifier gain value based on a comparison of the difference between the illuminated value and the reset value of the pixel signal to the decision threshold values.

According to this aspect, analog correlated double sampling may be performed on the pixel signal at least in part by a plurality of capacitors. According to this aspect, performing analog correlated double sampling on the pixel signal may include storing the illuminated value, storing the reset value, and subtracting the reset value from the illuminated value.

According to this aspect, the common ramp may be generated by a differential global ramp generator.

According to another aspect of the present disclosure, a time-of-flight image sensor including a readout circuit is provided. The readout circuit may comprise a pixel array including multiple pixels. The readout circuit may further comprise a multiplexer configured to select a plurality of the pixels of the pixel array. The multiplexer may be further configured to produce a multiplexed signal based on pixel signals of the selected one or more pixels over a series of timesteps and including an illuminated value for the selected one or more pixels at an illuminated timestep and a reset value for the selected one or more pixels at a reset timestep. The readout circuit may further comprise a plurality of gain selection comparators configured to select an amplifier gain value from a plurality of predefined amplifier gain values based upon a difference between the illuminated value and the reset value. The readout circuit may further comprise analog correlated double sampling circuitry configured to perform analog correlated double sampling on the multiplexed signal. The readout circuit may further comprise a programmable gain amplifier configured to generate an amplified multiplexed signal from the multiplexed signal, wherein the multiplexed signal is amplified at the selected amplifier gain value. The readout circuit may further comprise a first analog-to-digital converter and a second analog-to-digital converter configured to convert the amplified multiplexed signal to a first digital multiplexed signal and a second digital multiplexed signal respectively, wherein the first analog-to-digital converter and the second analog-to-digital converter respectively have a first common ramp and a second common ramp generated by a global ramp generator.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A time-of-flight image sensor including a readout circuit, the readout circuit comprising:
 a pixel array including multiple pixels and configured to produce a pixel signal for each of one or more pixels over a series of timesteps, the pixel signal including an illuminated value at an illuminated timestep and a reset value at a reset timestep;
 a plurality of gain selection comparators configured to receive the pixel signal and select an amplifier gain value from a plurality of predefined amplifier gain values based upon a difference between the illuminated value and the reset value;
 analog correlated double sampling circuitry configured to perform analog correlated double sampling on the pixel signal;
 a programmable gain amplifier configured to generate an amplified pixel signal from the pixel signal, wherein the pixel signal is amplified at the selected amplifier gain value; and
 a plurality of analog-to-digital converters configured to convert the amplified pixel signal to a digital pixel signal,
 wherein each of the plurality of the analog-to-digital converters has a common ramp generated by a global ramp generator.

2. The time-of-flight image sensor of claim 1, further comprising a multiplexer configured to:
 select the one or more pixels of the pixel array; and
 produce a multiplexed signal based on pixel signals of the selected one or more pixels.

3. The time-of-flight image sensor of claim 1, wherein the plurality of gain selection comparators are configured to:
 compare a value of the pixel signal to a plurality of decision threshold values, and
 select the amplifier gain value based on a comparison of the difference between the illuminated value and the reset value of the pixel signal to the decision threshold values.

4. The time-of-flight image sensor of claim 3, wherein the plurality of gain selection comparators includes six gain selection comparators.

5. The time-of-flight image sensor of claim 3, wherein the plurality of decision threshold values includes three decision threshold values and wherein the plurality of amplifier gain values includes four amplifier gain values.

6. The time-of-flight image sensor of claim 1, wherein the analog correlated double sampling circuitry includes a plurality of capacitors.

7. The time-of-flight image sensor of claim 6, wherein the plurality of gain selection comparators are connected in parallel to the plurality of capacitors.

8. The time-of-flight image sensor of claim 6, wherein the plurality of capacitors are configured to perform analog correlated double sampling on the pixel signal by:
 storing the illuminated value;
 storing the reset value; and
 subtracting the reset value from the illuminated value.

9. The time-of-flight image sensor of claim 8, wherein:
 the illuminated value is stored at a first pair of capacitors of the plurality of capacitors;
 the reset value is stored at a second pair of capacitors of the plurality of capacitors; and
 the reset value is subtracted from the illuminated value at a third pair of capacitors of the plurality of capacitors.

10. The time-of-flight image sensor of claim 1, wherein the analog-to-digital converters are single-slope analog-to-digital converters.

11. The time-of-flight image sensor of claim 10, wherein each single-slope analog-to-digital converter of the plurality of single-slope analog-to-digital converters includes a distributed source-follower.

12. The time-of-flight image sensor of claim 11, wherein each distributed source-follower is included in a feedback loop of the global ramp generator.

13. The time-of-flight image sensor of claim 11, wherein the global ramp generator is a differential global ramp generator.

14. A method for sensing a time-of-flight image, the method comprising:
 for one or more pixels of a pixel array, producing a pixel signal for each pixel of the one or more pixels over a series of timesteps, the pixel signal including an illuminated value at an illuminated timestep and a reset value at a reset timestep;
 at a plurality of gain selection comparators, receiving the pixel signal and selecting an amplifier gain value from a plurality of predefined amplifier gain values based upon a difference between the illuminated value and the reset value;
 performing analog correlated double sampling on the pixel signal;
 generating an amplified pixel signal from the pixel signal, wherein the pixel signal is amplified at the selected amplifier gain value;
 generating a common ramp for a plurality of analog-to-digital converters; and
 converting the amplified pixel signal to a digital pixel signal at the plurality of analog-to-digital converters.

15. The method of claim 14, further comprising, at a multiplexer:
 selecting the one or more pixels of the pixel array; and
 producing a multiplexed signal based on pixel signals of the selected one or more pixels.

16. The method of claim 14, further comprising, at the plurality of gain selection comparators:
 comparing a value of the pixel signal to a plurality of decision threshold values; and
 selecting the amplifier gain value based on a comparison of the difference between the illuminated value and the reset value of the pixel signal to the decision threshold values.

17. The method of claim 14, wherein analog correlated double sampling is performed on the pixel signal at least in part by a plurality of capacitors.

18. The method of claim 17, wherein performing analog correlated double sampling on the pixel signal includes:
 storing the illuminated value;
 storing the reset value; and
 subtracting the reset value from the illuminated value.

19. The method of claim 14, wherein the common ramp is generated by a differential global ramp generator.

20. A time-of-flight image sensor including a readout circuit, the readout circuit comprising:
 a pixel array including multiple pixels;
 a multiplexer configured to:
  select one or more pixels of the pixel array; and
  produce a multiplexed signal based on pixel signals of the selected one or more pixels over a series of timesteps and including an illuminated value for the selected one or more pixels at an illuminated timestep and a reset value for the selected one or more pixels at a reset timestep;
 a plurality of gain selection comparators configured to select an amplifier gain value from a plurality of predefined amplifier gain values based upon a difference between the illuminated value and the reset value;
 analog correlated double sampling circuitry configured to perform analog correlated double sampling on the multiplexed signal;
 a programmable gain amplifier configured to generate an amplified multiplexed signal from the multiplexed signal, wherein the multiplexed signal is amplified at the selected amplifier gain value; and
 a first of analog-to-digital converter and a second analog-to-digital converter configured to convert the amplified multiplexed signal to a first digital multiplexed signal and a second digital multiplexed signal respectively, wherein the first analog-to-digital converter and the second analog-to-digital converter each have a first common ramp and a second common ramp generated by a global ramp generator.

* * * * *